United States Patent
Ziarnik et al.

(10) Patent No.: US 8,909,909 B2
(45) Date of Patent: Dec. 9, 2014

(54) APPARATUS AND METHOD OF ACCESSING A COMPUTER PRE-BOOT ROUTINE BEFORE ACTIVATION OF A COMPUTER KEYBOARD

(75) Inventors: Gregory P Ziarnik, Houston, TX (US); Mark D. Tupa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 13/387,109

(22) PCT Filed: Mar. 17, 2010

(86) PCT No.: PCT/US2010/027713
§ 371 (c)(1), (2), (4) Date: Jan. 25, 2012

(87) PCT Pub. No.: WO2011/115621
PCT Pub. Date: Sep. 22, 2011

(65) Prior Publication Data
US 2012/0166780 A1    Jun. 28, 2012

(51) Int. Cl.
G06F 9/24    (2006.01)
G06F 9/00    (2006.01)
G06F 3/00    (2006.01)
G06F 1/24    (2006.01)
G06F 9/44    (2006.01)

(52) U.S. Cl.
CPC ............... G06F 1/24 (2013.01); G06F 9/4401 (2013.01)
USPC ...................... 713/1; 713/2; 710/10

(58) Field of Classification Search
CPC .................................................. G06F 9/4401
USPC ............................................................. 713/1
See application file for complete search history.

(56) References Cited

U.S. PATENT DOCUMENTS

| | | | |
|---|---|---|---|
| 5,398,333 A | 3/1995 | Schieve et al. | |
| 5,845,136 A * | 12/1998 | Babcock | 713/300 |
| 5,860,001 A | 1/1999 | Cromer et al. | |
| 6,625,742 B1 | 9/2003 | Owhadi et al. | |
| 6,647,512 B1 * | 11/2003 | James et al. | 714/36 |

(Continued)

FOREIGN PATENT DOCUMENTS

| | | |
|---|---|---|
| DE | 102005061961 | 6/2007 |
| EP | 2068246 | 6/2009 |

(Continued)

OTHER PUBLICATIONS

ISA/KR, International Search Report dated Dec. 13, 2010, PCT/US2010/027713, filed Mar. 17, 2010.

(Continued)

*Primary Examiner* — Suresh Suryawanshi
(74) *Attorney, Agent, or Firm* — Hewlett-Packard Patent Department

(57) ABSTRACT

An example method comprises activating a computer power-on button and releasing the power-on button when the computer begins to energize; reactivating the computer power-on button a second time within a predetermined time period from the first activating step; and sensing the reactivating step with the predetermined time period and initiating a command to enter a BIOS pre-boot routine instead of booting to the computer operating system (OS). The command to enter the BIOS pre-boot routine is initiated before activation of a computer keyboard.

20 Claims, 2 Drawing Sheets

(56) References Cited

U.S. PATENT DOCUMENTS

| | | | |
|---|---|---|---|
| 7,076,646 | B2 | 7/2006 | Chang |
| 7,111,083 | B2 * | 9/2006 | Miller ............................ 710/10 |
| 7,251,726 | B2 * | 7/2007 | Lodolo et al. .................... 713/1 |
| 7,711,324 | B2 * | 5/2010 | Wutka ......................... 455/41.2 |
| 8,046,575 | B2 * | 10/2011 | Lin et al. .......................... 713/2 |
| 8,090,937 | B2 * | 1/2012 | Beelitz et al. .................... 713/2 |
| 8,482,324 | B2 * | 7/2013 | Chen ............................. 327/143 |
| 2002/1440300 | | 10/2002 | Miller |
| 2003/0163765 | A1 | 8/2003 | Eckardt et al. |
| 2004/0064457 | A1 | 4/2004 | Zimmer et al. |
| 2004/0128494 | A1 | 7/2004 | Zimmer et al. |
| 2004/0230963 | A1 | 11/2004 | Rothman et al. |
| 2005/0240832 | A1 | 10/2005 | Owhadi |
| 2006/0294402 | A1 * | 12/2006 | Poisner ........................ 713/300 |
| 2007/0162735 | A1 * | 7/2007 | Cho ................................. 713/2 |
| 2007/1687380 | | 7/2007 | Wang et al. |
| 2008/0177994 | A1 | 7/2008 | Mayer |
| 2009/0013164 | A1 | 1/2009 | Huang et al. |
| 2009/0249434 | A1 | 10/2009 | Challener et al. |

FOREIGN PATENT DOCUMENTS

| KR | 10-20060068652 | 6/2006 |
|---|---|---|
| TW | 200807235 A | 2/2008 |
| TW | 200923783 A | 6/2009 |

OTHER PUBLICATIONS

European Patent Office. Supplementary European Search Report. Application No. 10 84 8103. Jul. 26, 2013.

Office Action, CN Application No. 201080065501.8, Date Issued: Aug. 28, 2014, pp. 1-10.

* cited by examiner

APPARATUS AND METHOD OF ACCESSING A COMPUTER PRE-BOOT ROUTINE BEFORE ACTIVATION OF A COMPUTER KEYBOARD

BACKGROUND OF THE INVENTION

The present invention relates generally to accessing low-level sources of a computer system during the initial booting process, and more particularly to a user-friendly technique for enabling easy access to the pre-boot functions in a personal computer without requiring hardware modifications.

Personal computers (pc's) are well known in the art and are virtually ubiquitous in today's world used as both a business tool and consumer appliance. When a pc is first turned on by depressing the main power button, the device enters into what is referred to as a boot process. That process is defined by initialization control information to load the available programs in the BIOS start-up since there is nothing in memory initially to execute. There are some pre-boot diagnostics that occur, such as the Power On Self Test (or just POST), to check that various things in the computer are functioning properly. During pre-booting of the computer it is possible for the user to enter a pre-boot environment to be able to update one or more low-level system resources.

In recent years with a greater number of functions and programs being added to new computers, the boot times have increased substantially causing irritation to impatient users. Programs like TweakUI have become popular to customize and speed up the response time of the Start Menu. Consequently some pc and software vendors responded to the long boot-time complaints by enabling users to skip some of the normal tests and enter what is referred to as a quick boot or "quick-start" process to speed up the basic booting process often to something less than 30 seconds. This was generally seen as a great advance by most impatient users, since they did not want to suffer through a "lengthy" booting process. In doing so however, it became increasingly difficult to access the pre-boot functionality in the boot device selection menu. There are several reasons for the short access window, but the main two reasons lie in the keyboard (KB) controller initialization and the graphics sequence. In some cases it is possible to complete the POST testing before either the KB controller or graphics cards are responding. Since it is normally necessary to use the keyboard to enter the pre-boot sequence (by depressing a special hot-key like "F1" or a key sequence like CNTL+ESC), the user of a quick boot pc is often locked out of the normal pre-boot sequence since the system boots up before the user can functionally access the keyboard or see the graphics on a display screen. For quick booting systems, what is clearly needed is a simple and. inexpensive method of entering the pre-boot functionality without requiring the use of the keyboard.

While the following discussion focuses primarily on a desktop pc, it certainly could be used in any computer whether or not the quick-boot functionality has been added to the computer.

Further limitations and disadvantages of conventional and traditional approaches will become apparent to one skilled in the art, through comparison of such devices with a representative embodiment of the present invention as set forth in the remainder of the present application with reference to the drawings.

BRIEF DESCRIPTION OF THE DRAWINGS

For a better understanding of the invention as well as further features thereof, reference is made to the following description which is to be read in conjunction with the accompanying drawings wherein.

DETAILED DESCRIPTION

Reference will now be made in detail to a representative embodiment of the present invention shown in the accompanying drawings. Furthermore, in the following detailed description, numerous specific details are set forth in order to provide a thorough understanding of the present invention. However, it will be obvious to one of ordinary skill in the art that the present invention can be practiced without many of these specific details.

Figure 1:
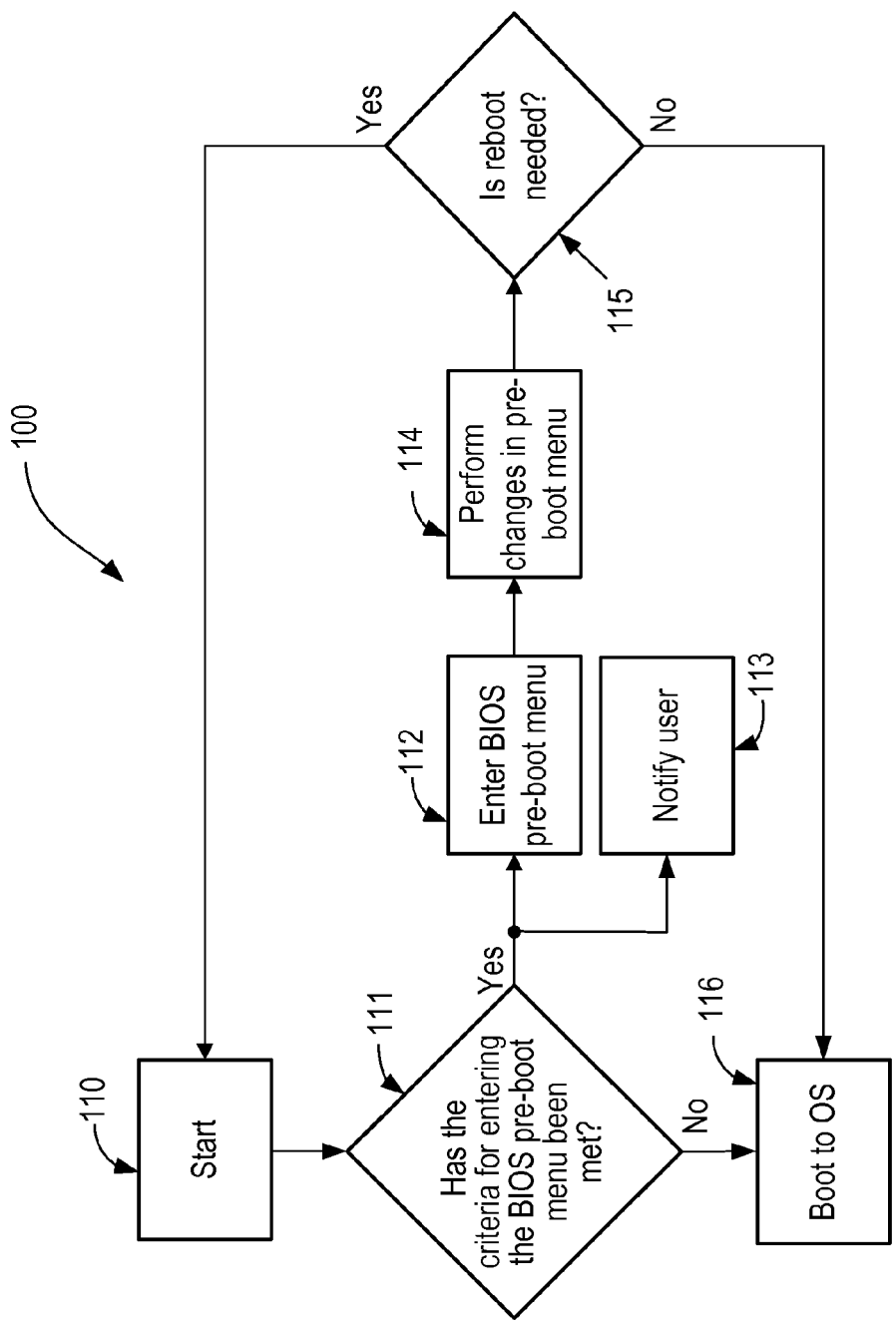
FIG. 1 is a flowchart illustrating exemplary operations for implementing an embodiment of the present invention.

The present invention provides, among other things, a method of entering a computer system's pre-boot functions without requiring the keyboard drivers to be installed. FIG. 1 is a flowchart illustrating exemplary operations 100 for controlling the booting functionality of a typical pc in accordance with one of the embodiments of this invention. At initial step 110 the main start button is depressed normally to initiate the power up process of the pc, but if the user wishes to access the BIOS pre-boot routine he may activate a special sequence. At step 111 the system tests to determine if the programmed criteria for entering the BIOS pre-boot menu has been met. That criteria is either determining if the power on switch, i.e., the main start button, has been depressed and held for a time interval less than 4 seconds, or determining if the power on button has been depressed and released twice within the same under 4-second interval. (We chose a time interval under 4 seconds, since the 4-second period is usually the time period associated with an emergency main power-off command in windows-based systems. Alternatively it would be possible to inactivate the 4-second power-off feature or to reset it in the BIOS to something else.) If the under 4-second test is not met, the system boots normally to the Operating System (OS) at step 116. However, if the user desires to make some change in the pre-boot menu, the user depresses the power-on button for an extended period or if the power on button is depressed, released, and depressed again in the same under 4-second period, the system enters the BIOS pre-boot menu at step 112 and an alarm is passed up to the user at step 113 to notify the user that he has entered the pre-boot menu routine and to release the power-on button. In one of the embodiments we momentarily turn off the power-on button LED to produce a flash/blink, and also provide an audible beep via the mini speaker mounted on the motherboard. Since the pc speaker on the motherboard is the first device activated during the boot process to communicate error codes or other problems, it is available to provide the desired audible beep to the user. (Both notifications, the blink and a beep, are often settable functions via the system control panel.) Once the system has entered the pre-boot environment, the system is available, at step 114, for the user to make whatever changes are desired via the pre-boot BIOS menu. When these changes have been made and the user selects the Enter key function, the system at step 115 can either go into a reboot, if necessitated by the changes made, or it can enter the normal boot routine at step 116. If a reboot is necessary due to the changes entered at step 114, the system automatically restarts to load and implement the pre-boot program changes.

Figure 2:
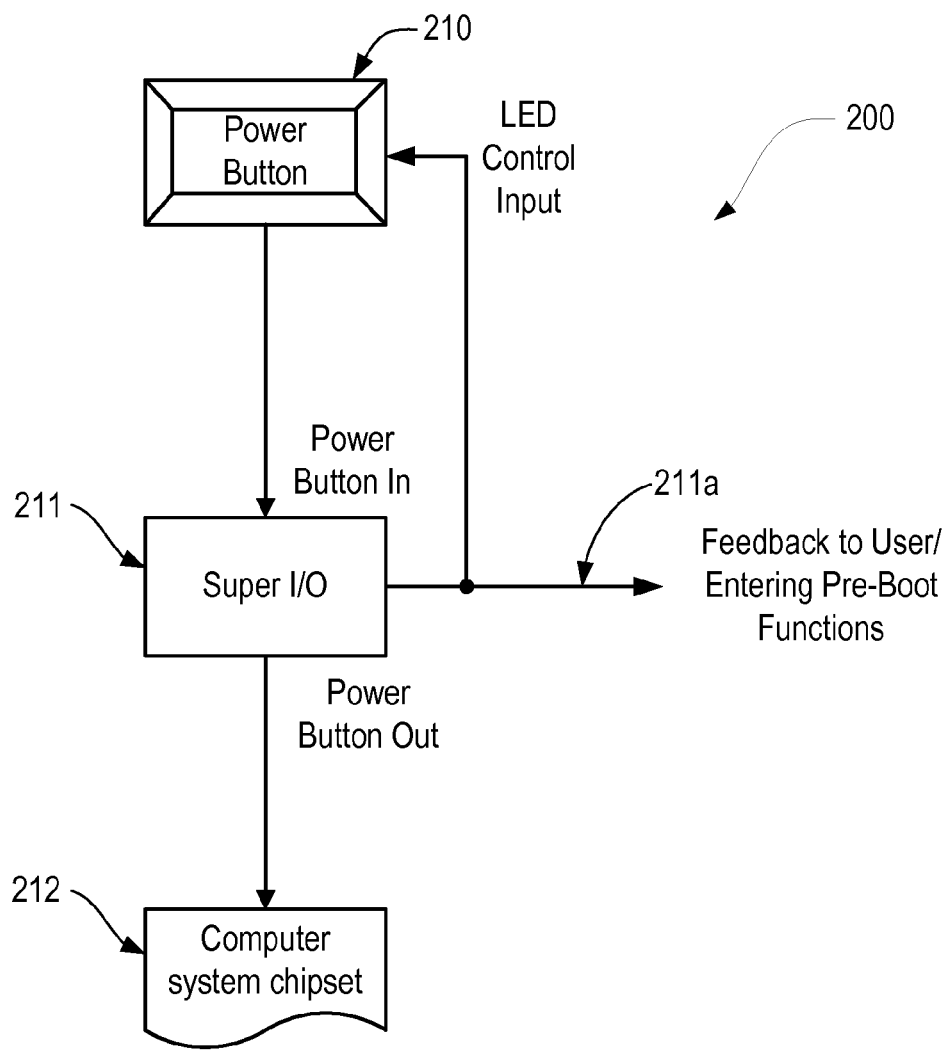
FIG. 2 is a schematic diagram illustrating the apparatus for implementing the process described in connection with FIG. 1 in accordance with the present invention.

From a hardware perspective reference is made to FIG. 2 which depicts the few physical components 200 needed to implement the process shown in FIG. 1. As shown in FIG. 2 the power button 210 connects to a Super I/O chip 211 which in turn connects to the Computer Chipset 212. in the embodiment of the present invention as shown, we use a Super I/O chip 211 having a timer function that can be programmed to provide the desired predetermined time interval.

The SI/O 211 (Super Input/Output chip) is a fairly standard ASIC today located on the motherboard that controls the slower-speed peripherals used in virtually every pc. (In most pc's there are several such chips used for a variety of reasons.) Typically it includes a floppy disk controller, a serial port controller, and a circuit to drive a higher-speed parallel port. However, since we are only using a timer circuit function within the SI/O for this particular application, an alternative would be to use a custom ASIC implementing the same timer function. Either the custom timer ASIC or the SI/O 211 latches either when the power button is depressed a second time after the first depression or latches if the power button is depressed continuously for the under 4-second period. (Before the BIOS hands off to the operating system, the BIOS will check a status bit in the SI/O 211 output pins, and if set, will enter the desired pre-boot routine, or display a menu allow selection of all pre-boot functions.) The SI/O 211 chip has the ability to reject the second key depression if too long a period has expired, since these parameters are programmable. The output on 211a connects to the LED in the Power Button (not shown) to provide the visual indication noted above and to the motherboard speaker (also not shown) to provide the audible (beep) indication for the user that the system is entering the pre-boot process.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A method comprising:
    activating a computer power-on button and releasing the power-on button when a computer begins to energize;
    reactivating the computer power-on button a second time within a predetermined time period;
    sensing the reactivating of the power-on button within the predetermined time period; and,
    in response to the reactivating of the power-on button within the predetermined time period, initiating a command to enter a BIOS pre-boot routine instead of booting to the computer operating system (OS),
    wherein the command to enter the BIOS pre-boot routine is initiated before activation of the keyboard.

2. The method as in claim 1 wherein the predetermined period of time is less than an emergency main power-off time period.

3. The method as in claim 2 further comprising, after the sensing the reactivating of the power-on button within the predetermined time period:
    sending a notification to a computer user that the computer has successfully initiated the desired pre-boot routine.

4. The method as in claim 3 wherein sending the notification includes:
    causing a power-on button LED to flash a single time; and
    causing a computer internal speaker to provide an audible indication to the computer user.

5. The method as in claim 1, wherein the predetermined period of time is less than 4 seconds.

6. A method, comprising:
    activating a computer power-on button to start a power-on sequence;
    continue activating the computer power-on button for a predetermined period of time;
    sensing the activating step for the predetermined time period; and
    initiating a command to enter a BIOS pre-boot routine,
    wherein the command to enter the BIOS pre-boot routine is initiated before activation of a computer keyboard.

7. The method as in claim 6 wherein the predetermined period of time is less than an emergency main power-off time period.

8. The method as in claim 7 further comprising:
    after sensing the activating step for the predetermined time period, sending a notification to the computer user that the computer has successfully initiated the desired pre-boot routine thereby informing the computer user to cease activating the computer power-on button.

9. The method as in claim 8 wherein the sending a notification step further comprises:
    causing a power-on button LED to flash a single time; and
    causing a computer internal speaker to provide an audible indication to the computer user.

10. Apparatus in a computer system, said apparatus comprising:
    a user activated power-on button for powering up the computer system; and
    a timer circuit for sensing the length of time a user depresses the power-on button, whereby if the power-on button is depressed for less than a predetermined period of time the timer circuit allows the computer system to boot in its normal sequence, and if the power-on button is depressed for more than a predetermined period of time the timer circuit causes the computer system to enter a pre-boot routine before activation of a keyboard of the computer system.

11. The apparatus as in claim 10 further comprising:
    an alarm circuit causing a momentary audible and visual alarm when the computer system enters a pre-boot routine.

12. The apparatus as in claim 11, wherein the predetermined period of time is less than 4 seconds in duration.

13. The apparatus as in claim 12, wherein the timer circuit further comprises a super I/O chip.

14. Apparatus in a computer system, said apparatus comprising:
    a user activated power-on button for powering up the computer system; and
    a timer circuit for sensing whether a user depresses the power-on button twice within a predetermined period of time, whereby if the power-on button is depressed only once within a predetermined period of time the timer circuit allows the computer system to boot in its normal sequence, and if the power-on button is depressed twice within the same predetermined period of time the timer circuit causes the computer system to enter a pre-boot routine before activation of a keyboard of the computer system.

15. The apparatus as in claim 14 further comprising:
    an alarm circuit causing a momentary audible and visual alarm when the computer system enters a pre-boot routine.

16. The apparatus as in claim 15 wherein the predetermined period of time is less in duration than an emergency main power shutoff time period.

17. The apparatus as in claim 14 wherein the timer circuit further comprises a super I/O chip.

18. The apparatus as in claim 14, wherein an emergency main power shutoff feature has been inactivated.

19. The apparatus as in claim 14, wherein an emergency main power shutoff feature has been reset to a longer duration.

20. The method as in claim 1, wherein, upon exiting the BIOS pre-boot routine, the system proceeds to a normal boot routine without rebooting.

* * * * *